United States Patent
Bargas et al.

(10) Patent No.: US 9,514,785 B2
(45) Date of Patent: Dec. 6, 2016

(54) PROVIDING CONTENT ITEM MANIPULATION ACTIONS ON AN UPLOAD WEB PAGE OF THE CONTENT ITEM

(75) Inventors: Javier Andés Bargas, Buus (CH); Joao Paulo Gil de Paiva, Zurich (CH)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/606,401

(22) Filed: Sep. 7, 2012

(65) Prior Publication Data

US 2014/0075307 A1     Mar. 13, 2014

(51) Int. Cl.
*G06F 15/16* (2006.01)
*G11B 27/11* (2006.01)
(Continued)

(52) U.S. Cl.
CPC .............. *G11B 27/11* (2013.01); *G06F 17/30* (2013.01); *G06F 17/30849* (2013.01);
(Continued)

(58) Field of Classification Search
CPC ................... H04L 29/08306; H04L 29/08117; H04L 29/08495; H04L 67/06; H04L 67/1085; H04N 21/00; H04N 21/2223; H04N 21/2743; H04N 21/63; H04N 21/631; H04N 21/637; H04N 21/6371; H04N 21/6377; H04N 21/63775; H04N 2021/00; H04N 21/658; H04N 21/40; H04N 21/4223; H04N 21/4425; H04N 21/4725; H04N 21/858; H04N 5/44543; H04N 21/4622; H04N 21/47; H04M 2203/553; G06F 3/0486; G06F 3/0482; G06F 3/005; G06F 3/00; G06F 17/30005; G06F 17/30002; G06F 17/30781; G06F 17/30017; G06F 17/30076; G06F 17/30126; G06F 17/3079; G06F 17/30825; G06F 17/30837; G06F 17/30846; G06F 17/30849; G06F 17/30855; G06F 17/30858; G06F 17/30861; G06F 17/3089; G06F 2003/00; G06F 3/01; G06F 17/30; G06K 9/00711; G06K 9/46; G11B 27/105; G11B 27/34; G11B 27/03; G11B 27/00
(Continued)

(56) References Cited

U.S. PATENT DOCUMENTS 8,169,916 B1 *   5/2012   Pai .................... H04N 21/2181
                                                        370/236
8,209,396 B1 *   6/2012   Raman et al. ................ 709/217
(Continued)

FOREIGN PATENT DOCUMENTS

| KR | 1020020039791 A | 5/2002 |
|---|---|---|
| KR | 10200900226677 A | 3/2009 |
| KR | 1020120028744 A | 3/2012 |

OTHER PUBLICATIONS

International Search Report and the Written Opinion of the International Searching Authority for International Patent Application No. PCT/US2013/058594, mailed Dec. 27, 2013, 12 pages.

*Primary Examiner* — Tadeese Hailu
*Assistant Examiner* — Alvaro R Calderon, IV
(74) *Attorney, Agent, or Firm* — Lowenstein Sandler LLP (57) ABSTRACT

A system and method to provide content item manipulation actions for a content item on an upload web page is presented. The method can include initializing an upload process for a content item to be uploaded to a server. The method can also include prior to completion of an upload data transfer of the upload process, providing, on a user interface (UI) comprising an upload progress indicator of the upload process, an option to add the content item to at least one playlist. Furthermore, the method can include subse-
(Continued)

quent to completion of the upload data transfer and completion of a processing operation of the content item, providing, on the UI comprising the upload progress indicator, an option to edit the content item and/or an option to share the content item.

20 Claims, 6 Drawing Sheets

(51) Int. Cl.
| | |
|---|---|
| G06F 17/30 | (2006.01) |
| G11B 27/031 | (2006.01) |
| G11B 27/10 | (2006.01) |
| H04N 21/00 | (2011.01) |
| H04N 21/2743 | (2011.01) |
| H04N 21/472 | (2011.01) |
| H04N 21/61 | (2011.01) |
| H04N 21/643 | (2011.01) |
| G11B 27/34 | (2006.01) |

(52) U.S. Cl.
CPC .......... *G11B 27/031* (2013.01); *G11B 27/105* (2013.01); *G11B 27/34* (2013.01); *H04N 21/00* (2013.01); *H04N 21/2743* (2013.01); *H04N 21/47202* (2013.01); *H04N 21/6175* (2013.01); *H04N 21/64322* (2013.01)

(58) Field of Classification Search
USPC .......................................... 715/716–726, 972
See application file for complete search history.

(56) References Cited

U.S. PATENT DOCUMENTS

| | | | |
|---|---|---|---|
| 2004/0083273 A1* | 4/2004 | Madison et al. .............. 709/217 |
| 2006/0259589 A1* | 11/2006 | Lerman et al. ............... 709/219 |
| 2007/0174774 A1* | 7/2007 | Lerman et al. ............... 715/723 |
| 2007/0183741 A1* | 8/2007 | Lerman et al. ................. 386/54 |
| 2007/0203911 A1* | 8/2007 | Chiu ............................... 707/10 |
| 2008/0036917 A1* | 2/2008 | Pascarella et al. ........... 348/702 |
| 2008/0270569 A1* | 10/2008 | McBride et al. ............. 709/217 |
| 2009/0006335 A1* | 1/2009 | Prager ............................. 707/3 |
| 2009/0327100 A1* | 12/2009 | Greenberg et al. ............. 705/27 |
| 2010/0110200 A1* | 5/2010 | Lau et al. ................... 348/207.1 |
| 2011/0029417 A1* | 2/2011 | Tijerino ............ G06F 17/30058 705/30 |
| 2011/0107234 A1 | 5/2011 | Lee et al. |
| 2011/0167462 A1* | 7/2011 | O'Connor et al. ........... 725/110 |
| 2011/0191163 A1* | 8/2011 | Allaire et al. ............. 705/14.39 |
| 2011/0202424 A1* | 8/2011 | Chun ..................... G06F 3/0481 705/26.8 |
| 2011/0212430 A1* | 9/2011 | Smithmier et al. ........... 434/322 |
| 2011/0288946 A1* | 11/2011 | Baiya et al. ................. 705/26.1 |
| 2012/0144327 A1* | 6/2012 | Johnson ..................... G06F 8/34 715/763 |
| 2012/0185568 A1* | 7/2012 | Broyde et al. ................ 709/219 |
| 2012/0192086 A1* | 7/2012 | Ghods ..................... G06Q 10/10 715/753 |
| 2012/0233648 A1* | 9/2012 | Raman et al. .................. 725/93 |
| 2012/0331091 A1* | 12/2012 | Tseng ...................... H04L 67/06 709/217 |
| 2012/0331394 A1* | 12/2012 | Trombley-Shapiro et al. ............................ 715/748 |
| 2013/0103757 A1* | 4/2013 | Mitchell ............... G06Q 50/01 709/204 |

* cited by examiner

```
Receive request to upload a content item to a shared content hosting and
delivery platform from a user
                                                                    410
```

↓

```
Establish upload communication session
                                                                    420
```

↓

```
When content item is being uploaded to platform, provide content
manipulations actions in UI of upload page that are allowed during upload data
transfer of the content item
                                                                    430
```

↓

```
When content item is being simultaneously uploaded and processed, provide
content manipulations actions in UI of upload page that are allowed during
simultaneous upload data transfer and processing of the content item
                                                                    440
```

↓

```
When content item is fully uploaded and being processed, provide content
manipulations actions in UI of upload page that are allowed after complete
upload data transfer and during ongoing processing of the content item
                                                                    450
```

↓

```
When content item is fully uploaded and processed, provide content
manipulations actions in UI of upload page that are allowed after complete
upload data transfer and processing of the content item
                                                                    460
```

↓

```
Respond to content item manipulation action
requests submitted by user from UI of upload
page
                                        470
```

```
┌─────────────────────────────────────────────────────────────┐
│  Request to upload content item to a shared content hosting │
│  and delivery platform                                       │
│                                                         510  │
└─────────────────────────────────────────────────────────────┘

┌─────────────────────────────────────────────────────────────┐
│  Establish upload communication session with a shared       │
│  content hosting and delivery platform                      │
│                                                         520 │
└─────────────────────────────────────────────────────────────┘
                              │
                              ▼
┌─────────────────────────────────────────────────────────────┐
│  Receive a file representing a UI for an upload page         │
│  associated with the upload communication session            │
│                                                         530  │
└─────────────────────────────────────────────────────────────┘
                              │
                              ▼
┌─────────────────────────────────────────────────────────────┐
│  Render file in web browser application in order to generate│
│  UI depicting upload progress of the content item, where UI  │
│  includes content manipulation actions that are presented at │
│  each stage of the upload process                            │
│                                                         540  │
└─────────────────────────────────────────────────────────────┘
                              │
                              ▼
┌─────────────────────────────────────────────────────────────┐
│  Send request to perform one or more of the content         │
│  manipulation actions from the UI of the upload page that   │
│  are selected by a user of the client device                │
│                                                         550 │
└─────────────────────────────────────────────────────────────┘
                              │
                              ▼
┌─────────────────────────────────────────────────────────────┐
│  Receive notification that requested action has been        │
│  processed by the shared content hosting and delivery       │
│  platform                                                    │
│                                                         560 │
└─────────────────────────────────────────────────────────────┘
```

PROVIDING CONTENT ITEM MANIPULATION ACTIONS ON AN UPLOAD WEB PAGE OF THE CONTENT ITEM

TECHNICAL FIELD

Embodiments of the present disclosure relate to the field of content sharing platforms and, more particularly, to providing content item manipulation actions on an upload web page of the content item.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos.

One aspect of content sharing platforms is the upload of content items to the content sharing platform by users of the platform. Upload may refer to the sending of data from the user's computer system to a remote system of the content sharing platform with the intent that the content sharing platform should store a copy of the data being transferred. However, the entire upload process for a content item may involve other processes beyond just the upload data transfer of the content item, such as transcoding.

When transferring a content item for hosting by a content sharing platform, there are many actions a user may wish to take to edit and prepare the content item for the viewing audience of the content sharing platform. For example, a user may wish to designate other users to share the content item with. Furthermore, a user may wish to enter title and description, and tag information associated with the content item. A user may also wish to edit the content item by cutting, trimming, changing the look, adding annotations, and/or taking other similar editing actions with respect to the content items. However, uploading and processing a content item, such as a video, can take more than a nominal amount of time to accomplish. Currently, this upload and processing time is inactive time in terms of productivity by the user with regard to editing and preparing his or her content item for presentation on the content sharing platform.

SUMMARY

In one implementation, a method to provide content item manipulation actions for a content item on an upload web page is presented. The method includes initializing an upload process for a content item to be uploaded to a server. The method can also include prior to completion of an upload data transfer of the upload process, providing, on a user interface (UI) comprising an upload progress indicator of the upload process, an option to add the content item to at least one playlist. Furthermore, the method can include subsequent to completion of the upload data transfer and completion of a processing operation of the content item, providing, on the UI comprising the upload progress indicator, an option to edit the content item and/or an option to share the content item.

In one implementation, the method can include subsequent to completion of the upload data transfer and completion of the processing operation of the content item, providing, on the same UI as the upload progress indicator, an option to view the content item. Furthermore, the method can include subsequent to completion of the upload data transfer and completion of the processing operation of the content item, providing, on the same UI as the upload progress indicator, an option to upload a custom image to represent the content item as a thumbnail image in various locations, such as in search results, playlists, or recommended content items. In addition, the processing operation can include a transcoding operation of the content item.

Furthermore, the option to share the content item in the method enables a user that provides the content item for the upload process to share the content item on social networks. In some implementations, the option to share the content item enables a user that provides the content item for the upload process to share the content item via email. In other implementations, the option to edit the content item enables a user that provides the content item for the upload process to at least one of cut, trim, change a look, or add annotations to the content item. In yet other implementations, the content item is a video.

In additional implementations, computing devices for performing the operations of the above described embodiments are also implemented. Additionally, in implementations of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

A system and method for providing content item manipulation actions on an upload web page of the content item are described. In some implementations, to use the upload time as effectively as possible, content item-related actions (such as sharing the content item, watching the content item, editing the content item, and so on) are made available to users on the same UI that displays the content item upload process. The actions can be made available when the upload process starts, during the upload process, or right away after the upload process ends.

In some implementations, the content item-related actions can include, but are not limited to, adding the content item to a playlist, sharing the content item, viewing the content item, editing the content item, and uploading an image to use as a thumbnail to represent the content item. In one implementation, adding the content item to a playlist and uploading an image to use as a thumbnail are actions that are provided on a UI of an upload web page of the content item during an upload data transfer process of the content item. In another implementation, sharing the content item, editing the content item, and viewing the content item are actions that are provided on the UI of the upload web page of the content item immediately after completion of the upload data transfer of the content item and a processing operation of the content item.

A method to provide content item manipulation actions on an upload web page of the content item includes initializing an upload process for a content item to be uploaded to a content sharing system. The method can also include prior to completion of an upload data transfer of the upload process, providing, on a user interface (UI) containing an upload progress indicator of the upload process, an option to add the content item to one or more playlists associated with the content sharing system. Furthermore, the method can include subsequent to completion of the upload data transfer and completion of a processing operation of the content item, providing, on the UI containing the upload progress indicator, an option to edit the content item and/or an option to share the content item.

It is to be appreciated that in accordance with one or more aspects described in this disclosure, users can opt-out of providing personal information, demographic information, location information, proprietary information, sensitive information, or the like in connection with data gathering aspects. Moreover, one or more aspects described herein can provide for anonymizing collected, received, or transmitted data.

Figure 1:
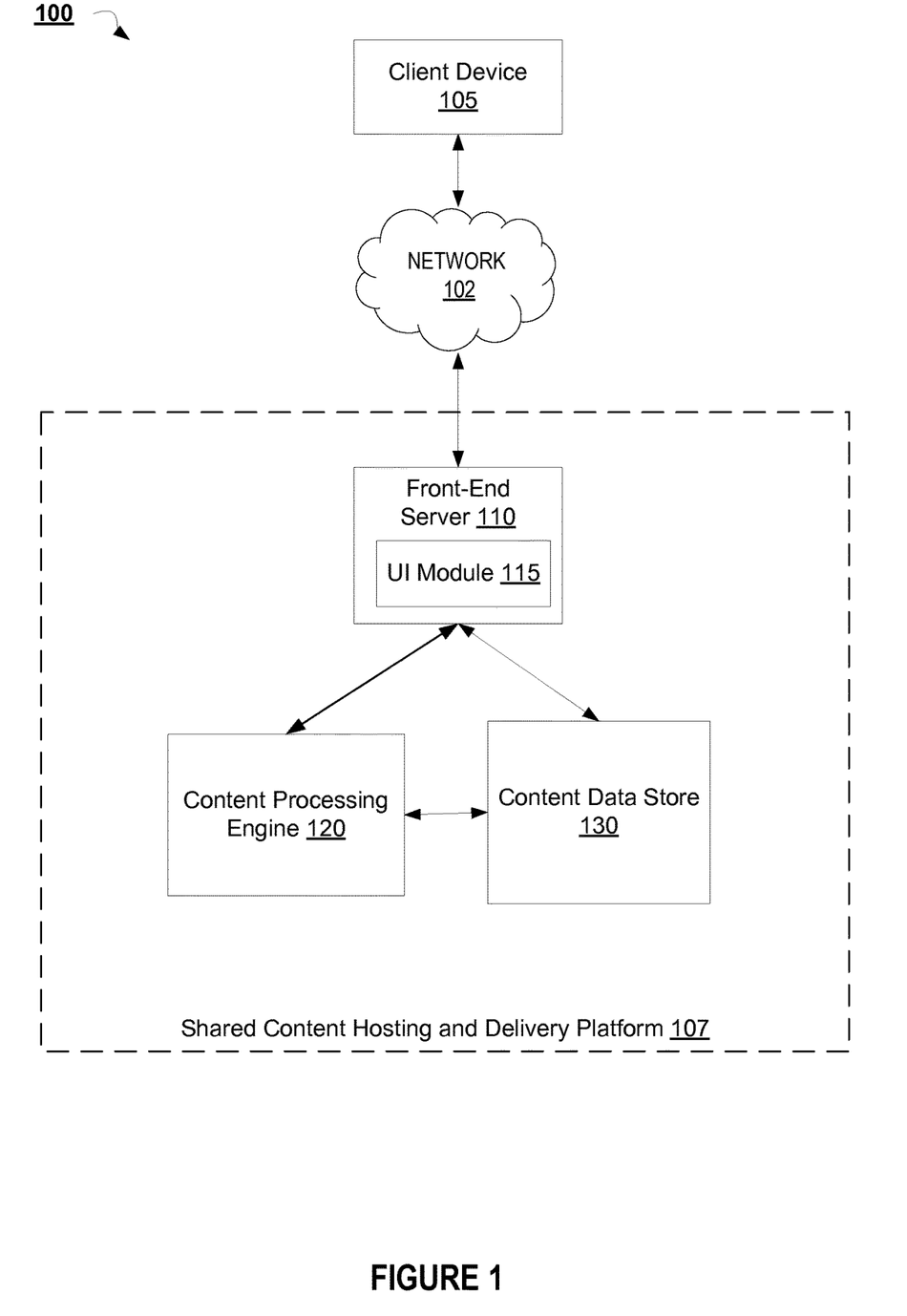
FIG. 1 illustrates an exemplary system architecture, in accordance with one implementation of the present disclosure.

FIG. 1 illustrates an exemplary system architecture 100, in accordance with one embodiment of the present disclosure. System 100 includes a client device 105 communicably coupled to a shared content hosting and delivery platform 107 via a network 102. The network 102 includes the Internet in one embodiment. In other embodiments, other networks, wired and wireless, such as an intranet, local area network (LAN), wide area network (WAN), or broadcast network may be used as or be part of network 102.

As illustrated, shared content hosting and delivery platform 107 includes front-end server 110, a content processing engine 120, and a content data store 130. A data store may include, but is not limited to, a table, a database, a directory, a repository, and one or more files, to name a few examples. One or more client devices 105 are in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, system 100 may support a large number of concurrent sessions with many client devices 105.

Shared content hosting and delivery platform 107 is capable of operating within a single server device or on multiple server devices. For example, although each of front-end server 110, content processing engine 120, and content data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user accesses shared content hosting and delivery platform 107 via client device 105 over network 102. The front-end server 110 receives communications from the client device 105, and processes and/or directs these communications accordingly. In one embodiment, the front-end server 110 comprises a processing device and a computer-readable memory.

Front-end server 110 is communicably coupled to a content processing engine 120, which may reside on the same machine as front-end server 110 or a different machine. Content processing engine 120 may be implemented in hardware, software, firmware, or any combination of the above. In implementations of the disclosure, content processing engine 120 accesses user content that is being uploaded to system 100 for storage in content data store 130 to process this uploaded content for sharing on the shared content hosting and delivery platform 107. Upload may refer to the sending of data from the user's client device 105 to the shared content hosting and delivery platform 107 with the intent that the shared content hosting and delivery platform 107 should store a copy of the data being transferred (e.g., in content data store 130).

In implementations of the disclosure, user content includes content generated by a user or content generated by a third party and permissibly uploaded by the user. In some implementations, the content includes movie clips, TV clips (news, sports, shows, etc.), music videos, video blogs, and video shorts. In one embodiment, the content processing engine 120 notifies users of the types of information that may be stored in the content data store 130, and provides the user the opportunity to opt-out of having such information stored and/or accessible by and/or shared with the content processing engine 120.

In some implementations, upon receiving at least a portion of an uploaded content item, the content processing engine 120 instructs a UI module 115 of the front-end server 110 to make one or more actions available to the user that allow the user to manipulate the presentation of the content item on the shared content hosting and delivery platform 107. Instead of the user proceeding to a separate viewing page to access and edit the uploaded content item after the upload process is complete, the actions are immediately presented by the UI module 115 on a same web page that the upload process interaction and progress was displayed (hereinafter known as the "upload web page"). When the shared content hosting and delivery platform 107 provides a high-load content processing engine 120 that can process and provide content items quickly after the content items are uploaded, the ability to provide the actions to manipulate the content item on the UI of the upload web page is useful and efficient to the user of shared content hosting and delivery platform 107.

The UI module 115 of front-end server 110 can be implemented in hardware, software, firmware, or any combination of the above. In one implementation, the UI module 115 creates a representation of a UI having the actions to manipulate the content item available to the user. In some implementations, multiple content item uploads and their associated actions are displayed on the same upload web page.

In one implementation, the content item manipulation actions may be shown as hyperlinks, radio buttons, drop-down menus, icons, and so on. The UI may be a file that is rendered in a web browser application of client device 105. The file may be in a markup language that causes the single progress indicator to be depicted in a graphical user interface (GUI). In some implementations, UI module 115 may be located in a different server device of shared content hosting and delivery platform 107 than the front-end server 110, such as in content processing engine 120.

In one example implementation, when a content item is uploaded to shared content hosting and delivery platform 107, there may be multiple subprocesses associated with this upload process. For example, one subprocess is the upload data transfer of the content item from the client device 105 to the content data store 130. Another subprocess may include the content processing engine 120 performing a transcoding of the content item after or during the upload data transfer process. Transcoding is the direct digital-to-digital data conversion of one encoding to another. Transcoding is often performed to provide support for different file formats for the content (e.g., mobile, different file sizes, different resolutions, etc.). In some embodiments, transcoding refers to a two-step process in which the original file/data is decoded to an intermediate uncompressed format, which is then encoded into the target format. In other implementations, transcoding refers to the process of directly changing assembled software code to work on a different platform or operating system. In another exemplary implementation, the processing performed by the content processing engine 120 includes translation of text to another language or any other type of content conversion processing. In one implementation, the processing of the content processing engine 120 occurs subsequent to (or in parallel) with the upload data transfer of the content being processed.

In one implementation, depending on a scope of a particular action, the action is made available at any of the following moments: prior to the upload data transfer process, during the upload data transfer process, during simultaneous upload data transfer and processing, and/or immediately after the content item has been completely transferred and processed by the content processing engine. In some implementations, the variety of actions to manipulate the content item include, but are not limited to, adding the content item to playlists, sharing the content item with other users, viewing the content item, editing the content item, and selecting a thumbnail image to represent the content item.

Adding the content item to playlists is an action that may be provided during the upload data transfer process on the upload web page. In one implementation, a playlist is a list of content items that can be played in sequential or shuffled order. For example, a user may add their content item to a "Watch later" playlist, a "Favorites" playlist, and/or any other custom playlists while the content item is being uploaded. In implementations of the disclosure, the adding action is provided on the same UI as the upload web page Sharing the content item with other users is an action that can be provided as soon as the content item is completely uploaded and processed. In implementations of the disclosure, the sharing action is provided on the same UI as the upload web page. In one implementation, a user can share their content item by selecting a "Share" button and then identifying various other users to share the content item with. In some implementations, the sharing of a content item is accomplished through social network communication and/or electronic mail communication.

Viewing the content item is an action that can be provided as soon as the content item is completely uploaded and processed. In implementations of the disclosure, the viewing action is provided on the same UI as the upload web page.

Editing the content item is an action that can be provided as soon as the content item is completely uploaded and processed. In implementations of the disclosure, the editing action is provided on the same UI as the upload web page. Editing actions may include, but are not limited to, cutting the content item, cropping the content item, trimming the content item, changing a look of the content item, changing audio options associated with the content item, adding annotation to the content item, updating/changing descriptive information of the content item, and so on.

Selecting a thumbnail image to represent the content item is an action that may be provided during the upload data transfer process on the upload web page. A thumbnail is a reduced-size version of an image that is used to help in recognizing, screening and organizing content items, serving the same role for images as a normal text index does for words. In one implementation, a list of thumbnail images gathered from the content item itself are displayed as thumbnail options to represent the content item in the shared content hosting and delivery platform 107. In other implementations, the user uploads a custom image to represent the content item. In the case of a custom image, when the user chooses to select the thumbnail image, a file browser dialog may be opened by a web browser application of the client device 105, with which the user can choose an image file to act as the representative thumbnail.

One skilled in the art will appreciate that other content item manipulation actions may also be presented on the UI of the upload web page, and that implementations of the disclosure are not limited to the above-provided examples.

Figure 2:
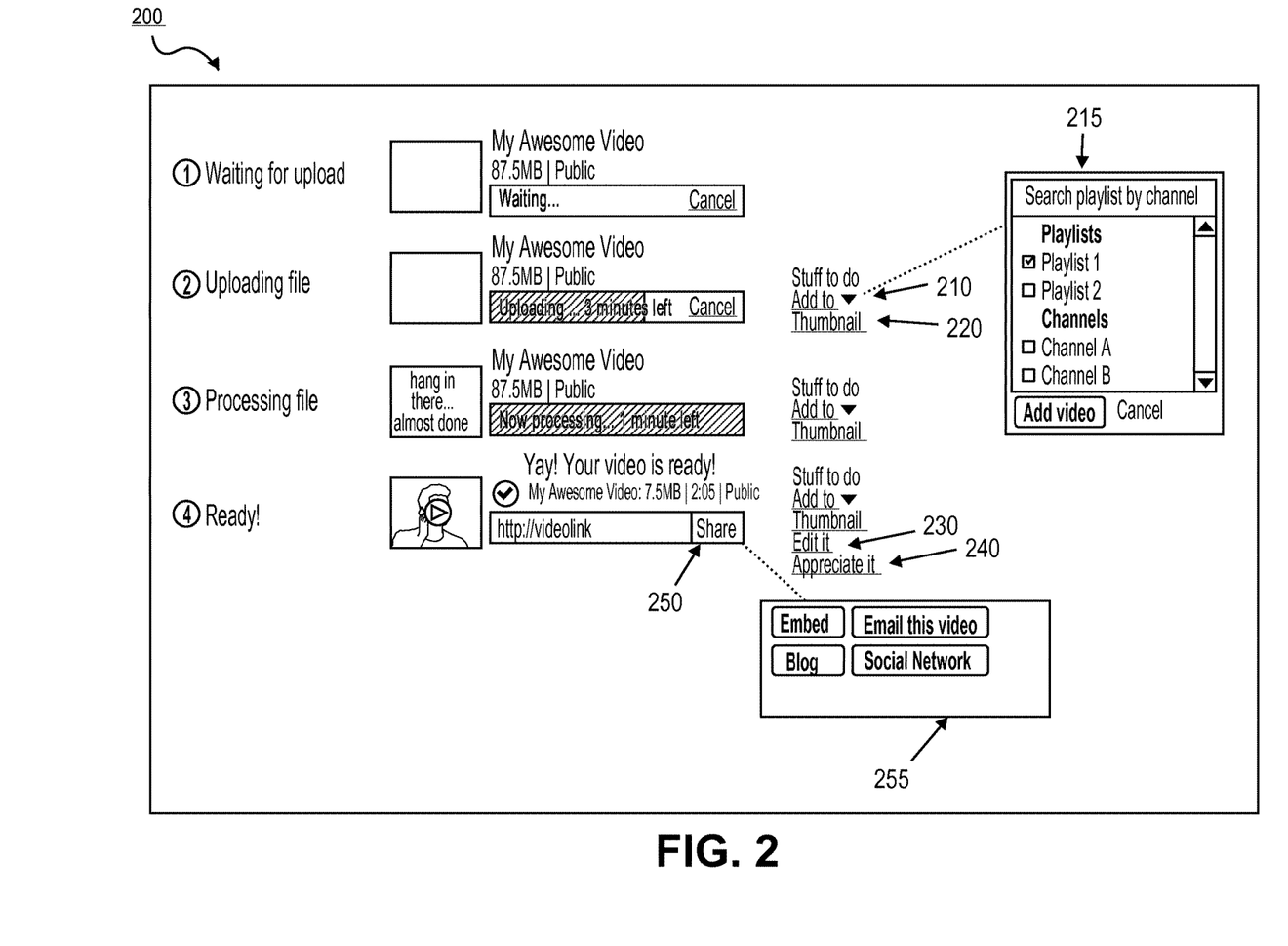
FIG. 2 is a screenshot of an upload web page depicting content item manipulation actions according to an implementation of the disclosure.

FIG. 2 is a screenshot of an exemplary upload web page 200 depicting content item manipulation actions according to an embodiment of the disclosure. Upload web page 200 may be generated based on code provided by a shared content hosting and delivery platform, such as shared content hosting and delivery platform 107 described with respect to FIG. 1. A web browser application of a client device, such as client device 105 of FIG. 1, may receive this code and render it for display on the client device 105 to a user of the client device 105.

Upload web page 200 depicts an upload process of a content item, namely a video, transferred from a client device to a shared content hosting and delivery platform. As shown, the various stages of the upload process are shown as "Waiting for upload", "Uploading file", "Processing file", and "Ready". In one implementation, once the video has begun the upload data transfer process (shown as "uploading file"), content item manipulation actions 210, 220 are displayed to the user. Action 210 allows the user to add the content item to one or more playlists or channels associated with the user and/or playlists or channels associated with other users. In one implementation, when the hyperlink for adding the content item action 210 is selected, a pop-up window 215 is shown that allows the user to select one or more playlists or channels to add the content item to, even while the content item is still being uploaded.

Figure 3:
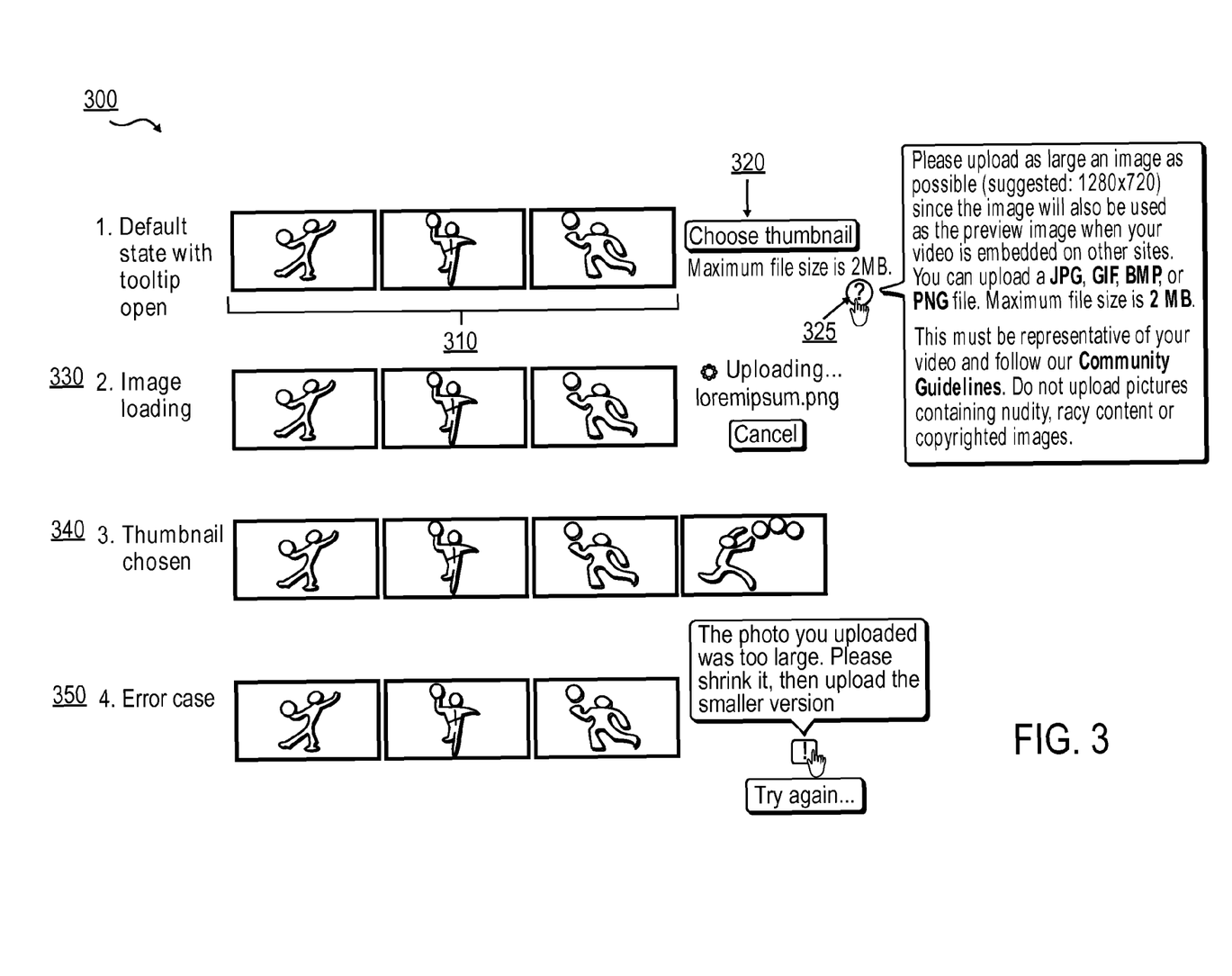
FIG. 3 is a screenshot depicting a window that is presented to a user that selects the thumbnail action according to an implementation of the disclosure.

Action 220 allows the user to select and/or upload a thumbnail image to represent the content item in the shared content hosting and delivery platform. FIG. 3 is a screenshot depicting an exemplary web browser window 300 that is presented to a user that selects the thumbnail action 220 of FIG. 2 according to an implementation of the disclosure. In one implementation, window 300 is a pop-up window separate from the upload web page 200. Window 300 may initially present pre-selected thumbnails 310 obtained from the content item. In one implementation, window 300 also provides a button 320 that allows the user to upload another image that can be used as the thumbnail image to represent the content item. In some implementations, an information icon 325, when hovered over, may provide a dialog window. The dialog window can provide additional information to the user about requirements of the custom images that can be uploaded as thumbnails.

In some implementations, only users having a privileged account with the shared content hosting and delivery platform are presented with the option to upload a custom image (that is not part of the content item) to represent the content item in a thumbnail. The remainder of window 300 depicts process steps occurring after a user has selected a custom image to use as a thumbnail for the content item, including, but not limited to, the upload of the custom image 330, a preview of the custom image as a thumbnail 340, and an error situation that may arise if the selected custom image does not satisfy thumbnail settings 350.

Referring back to FIG. 2, additional actions 230-250 are shown (in addition to the add action 210 and thumbnail action 220) when the upload process has progressed beyond the upload data transfer process and the processing of the content item. These actions may include, but are not limited to, editing 230 the content item, annotating 240 the content item, and sharing the content item 250. In one implementation, when a user selects the sharing action 250, a pop-up window 255 may be shown that presents various options for sharing, such as embedding a hyperlink to the content item into another web page, emailing the hyperlink to the content item, and sharing the hyperlink in a blog or social network, to name a few examples.

One skilled in the art will appreciate that upload web page 200 is one exemplary depiction of how implementations may present content item manipulations actions on an upload web page of the content item. Other presentations are also possible and contemplated by implementations of the disclosure.

Figure 4:
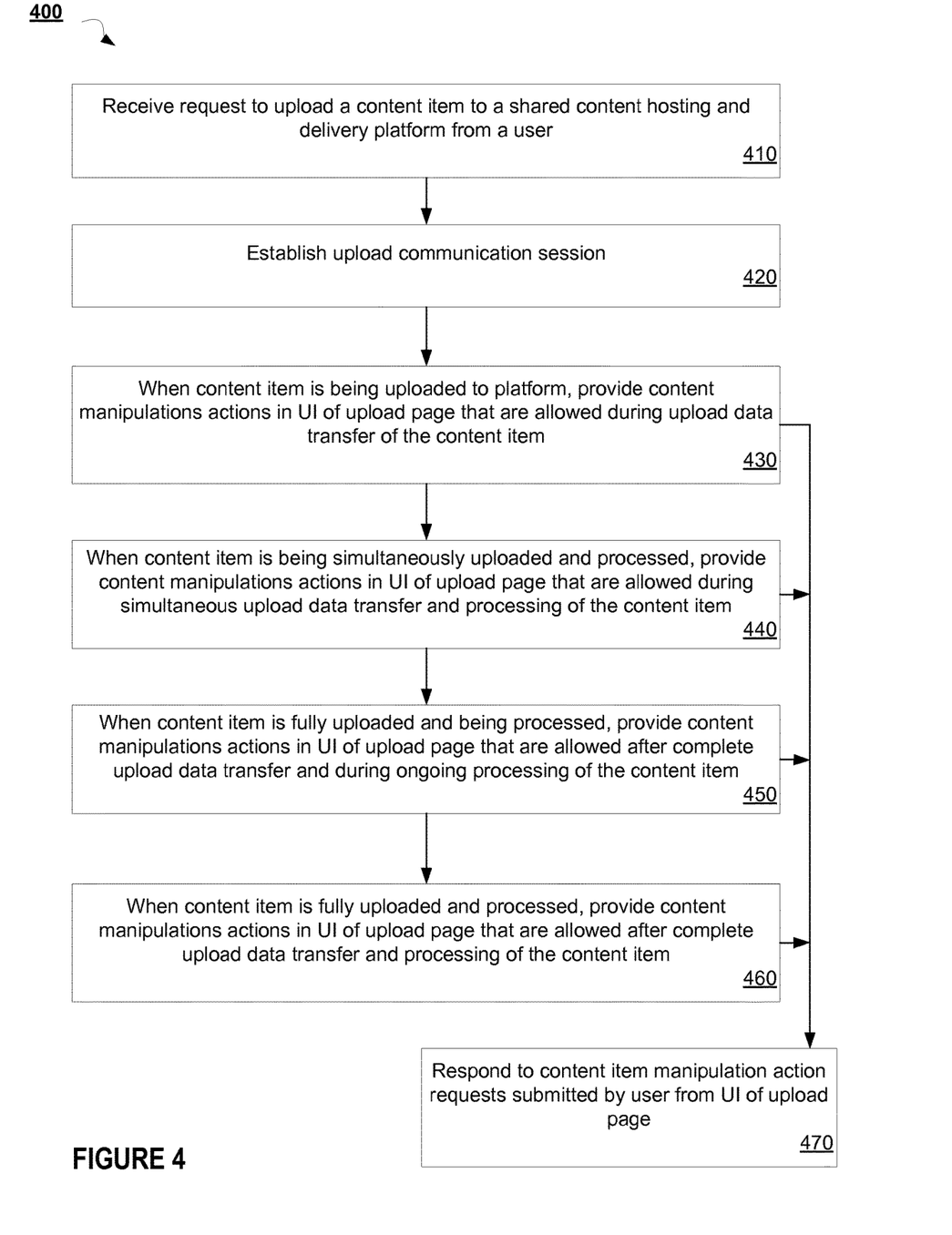
FIG. 4 shows a method of providing an upload web page UI including content item manipulation actions from a shared content hosting and delivery platform according to an embodiment of the disclosure.
Figure 5:
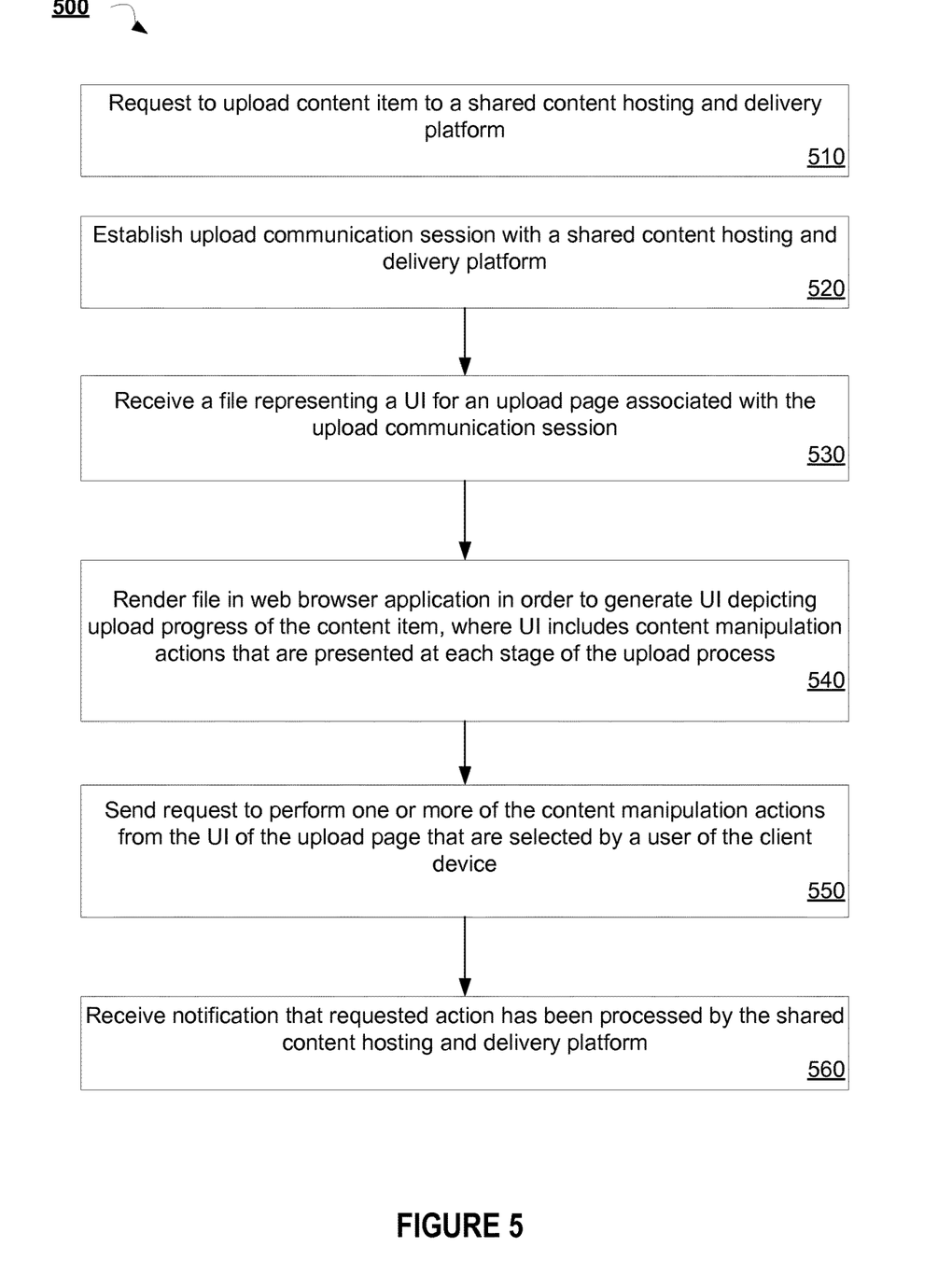
FIG. 5 is a flow diagram illustrating a method of generating a UI at a user device for an upload web page having manipulation actions for a content item being uploaded according to an embodiment of the disclosure.

FIGS. 4 and 5 are flow diagrams of various implementations of methods for providing content item manipulation actions on an upload web page of the content item. The methods are performed by processing logic that may include hardware (circuitry, dedicated logic, etc.), software (such as is run on a general purpose computer system or a dedicated machine), or a combination of both. In one implementation, the method of FIG. 4 may be performed by a content processing engine 120 and/or a UI module 115 running on a server machine or another machine as described with respect to FIG. 1. In another implementation, the method of FIG. 5 may be performed by a client device 105 as described with respect to FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

FIG. 4 is a flow diagram illustrating a method 400 of providing an upload web page UI including content item manipulation actions from a shared content hosting and delivery platform according to an implementation of the disclosure. At block 410, a request is received from a user to upload a content item to a shared content hosting and delivery platform. Then, at block 420, an upload communication session is established with the user.

At block 430, when the content item is being uploaded to the platform, content manipulation actions are provided in the UI of the upload web page, where the content manipulation actions include those that are allowed during an upload data transfer of the content item. In one implementation, the shared content hosting and delivery platform generates code for the file that represents the UI, where the code determines a stage (e.g., upload data transfer, upload data transfer and processing, fully uploaded with ongoing processing, fully uploaded and processed) of the upload process and corresponding content item manipulation actions that can be displayed in the UI for the associated determined stage.

In other implementations, the shared content hosting and delivery platform may monitor the progress of the upload process, and send instructions to the client device to update the UI of the upload web page with hyperlinks for the particular content item manipulations actions when the upload processes enters a new stage. The content item manipulation actions that are displayed during the content item upload data transfer may include, but are not limited to, adding the content item to one or more playlists and selecting a thumbnail image for the content item.

At block 440, when the content item is being simultaneously uploaded and processed, content manipulation actions are provided in the UI of the upload web page that are allowed during the simultaneous upload and processing of the content item. In one implementation, the processing may include a transcoding process. At block 450, when the content item has been fully uploaded and is still being processed, content manipulation actions are provided in the UI of the upload web page that are allowed after complete upload and during the ongoing processing of the content item.

At block 460, when the content item has been fully uploaded and processed, content manipulation actions are provided in the UI of the upload web page that are allowed after complete upload and processing. The content item manipulation actions that are displayed after the content item upload and processing are complete may include, but are not limited to, adding the content item to one or more playlists, selecting a thumbnail image for the content item, editing the content item, annotating the content item, and sharing the content item with other users. Lastly, at block 470, the shared content hosting and delivery platform responds to content item manipulation requests that are submitted from the user via the UI of the upload web page.

FIG. 5 is a flow diagram illustrating a method 500 of generating a UI at a user device for an upload web page having manipulation actions for a content item being uploaded according to an embodiment of the disclosure. At block 510 of method 500, a request to upload a content item is sent to a shared content hosting and delivery platform. In one embodiment, the request is made from a web browser application of the client device. At block 520, an upload communication session is established at the client device with the shared content hosting and delivery platform in response to the request.

At block 530, a file is received that represents a UI for an upload web page presenting a progress of the upload process for the content item. At block 540, the file is rendered by a web browser application of the client device. As part of rendering the file, the UI depicting the upload web page is generated and displayed on the client device. The UI also depicts content manipulation actions that are presented at different stages (e.g., upload data transfer, upload data transfer and processing, fully uploaded with ongoing processing, fully uploaded and processed) of the upload process. In one implementation, certain content item manipulations actions are displayed after particular stages of the upload process are complete.

In one example, the content item manipulation actions that are displayed during the content item upload data transfer stage may include, but are not limited to, adding the content item to one or more playlists and selecting a thumbnail image for the content item. In another example, the content item manipulation actions that are displayed after the content item upload data transfer and processing are complete may include, but are not limited to, adding the content item to one or more playlists, selecting a thumbnail image for the content item, editing the content item, annotating the content item, and sharing the content item with other users.

At block 550, a request to perform one or more of the content manipulation actions provided in the UI of the upload web page is sent to the shared content hosting and delivery platform. In one embodiment, the request is generated and sent after a user of the client device selects one or more of the content manipulation actions displayed on the UI of the upload web page. Lastly, at block 560, a notification that the request has been processed by the shared content hosting and delivery platform is received at the client device.

Figure 6:
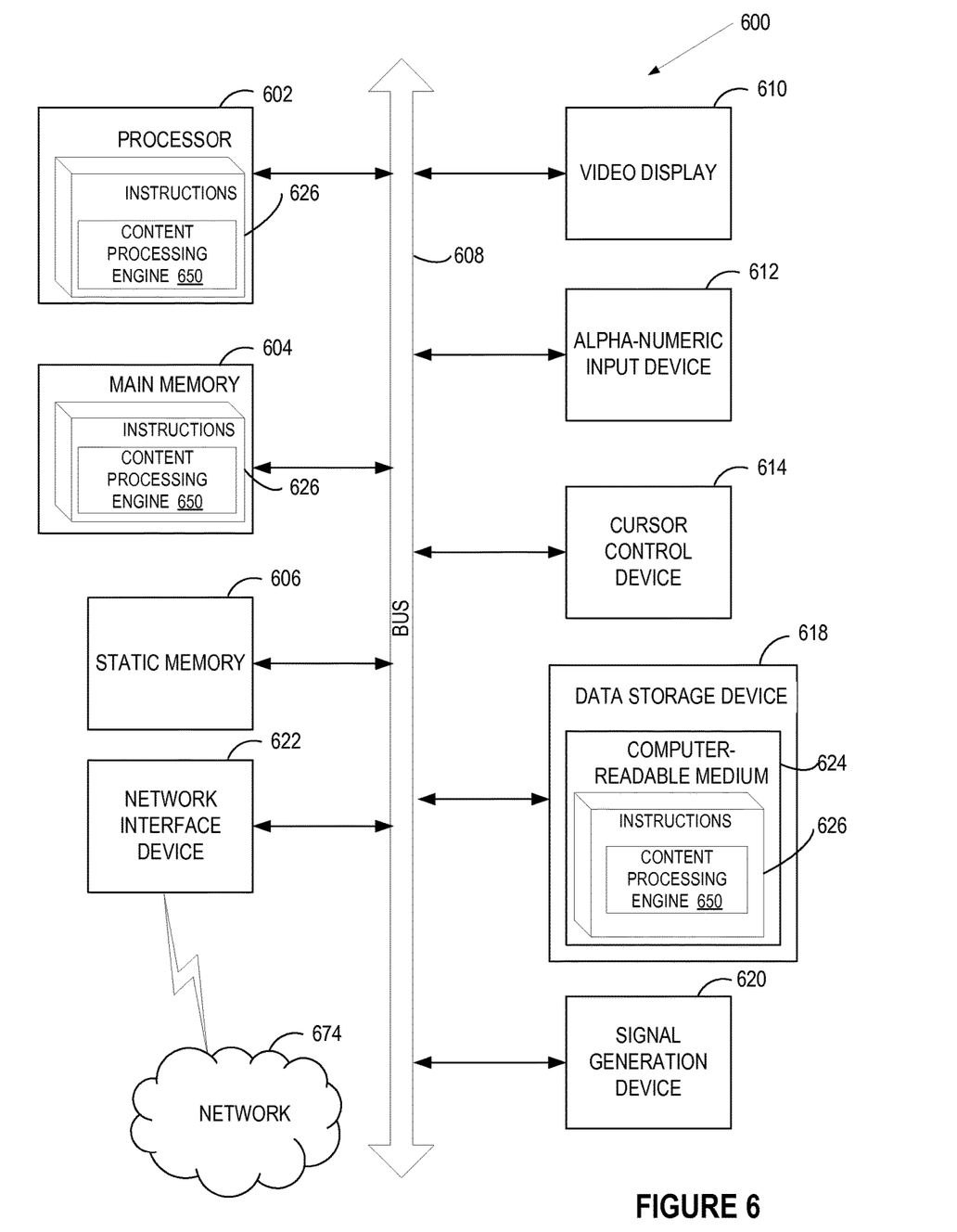
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a content processing engine 650, which may correspond to content processing engine 120 of FIG. 1, and/or a software library containing methods that call a content processing engine. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
   receiving a request to upload a content item to a shared content hosting and delivery platform;
   initializing, by a server computing device of the shared content hosting and delivery platform, an upload process for the content item, the upload process comprising a data transfer and a processing operation, wherein the data transfer comprises transmission of data of the content item from a client computing device to the server computing device, and wherein the processing operation comprises transcoding the content item;
   providing, by the server computing device, an upload user interface (UI) having a window comprising an upload progress indicator of the upload process, the upload progress indicator separately depicting progresses of the data transfer and the processing operation;
   during the data transfer of the upload process and prior to completion of the data transfer and the processing operation:
      modify the window of the upload UI to present a first set of actions comprising an option to add the content item to at least one playlist hosted by the shared content hosting and delivery platform and an option to add the content item to at least one channel hosted by the shared content hosting and delivery platform; and
      perform one or more actions of the first set of actions responsive to a user request for the one or more actions of the first set of actions via the upload UI; and
   subsequent to completion of both of the data transfer and the processing operation of the content item:
      modify the window of the upload UI to further present a second set of actions in addition to the first set of actions, the second set of actions comprising an option to edit the content item and an option to share the content item; and
      perform one or more actions of the second set of actions responsive to a user request for the one or more actions of the second set of actions via the upload UI.

2. The method of claim 1, further comprising subsequent to completion of the data transfer and completion of the processing operation of the content item, providing, on the upload UI comprising the upload progress indicator, an option to view the content item.

3. The method of claim 1, further comprising subsequent to completion of the data transfer and completion of the processing operation of the content item, providing, on the upload UI comprising the upload progress indicator, an option to upload a custom image to represent the content item as a thumbnail image.

4. The method of claim 1, wherein the processing operation further comprises translating the content item.

5. The method of claim 1, wherein the option to share the content item enables a user that provides the content item for the upload process to share the content item on a social network.

6. The method of claim 1, wherein the option to share the content item enables a user that provides the content item for the upload process to share the content item via electronic mail (e-mail).

7. The method of claim 1, wherein the option to edit the content item enables a user that provides the content item for the upload process to at least one of cut, trim, change a look, or add annotations to the content item.

8. The method of claim 1, wherein the content item is a video.

9. A client computing device comprising:
a display;
a memory; and
a processing device communicably coupled to the display and the memory, wherein the processing device is to:
receive a file representing a upload user interface (UI) for an upload progress indicator associated with an upload communication session for upload of a content item to a server device, the upload communication session comprising a data transfer and a processing operation, wherein the data transfer comprises transmission of data of the content item from the client computing device to a server computing device of a shared content hosting and delivery platform, and wherein the processing operation comprises transcoding the content item;
render, by an application executable from the memory by the processing device, a window of the upload UI, wherein the window of the upload UI comprises the upload progress indicator of the upload process, the upload progress indicator separately depicting progresses of the data transfer and the processing operation;
during the data transfer of the upload process and prior to completion of the data transfer and the processing operation:
update the window of the upload UI to present a first set of actions comprising an option to add the content item to at least one playlist hosted by the shared content hosting and delivery platform and an option to add the content item to at least one channel hosted by the shared content hosting and delivery platform; and
receive a user request for one or more actions of the first set of actions via the upload UI while the upload data transfer is occurring; and
subsequent to completion of both of the data transfer and the processing operation of the content item:
update the window of the upload UI to further present a second set of actions in addition to the first set of actions, the second set of actions comprising an option to edit the content item and an option to share the content item; and
receive a user request, via the upload UI, for at least one of the option to edit the content item or the option to share the content item.

10. The client computing device of claim 9, wherein the server computing device is hosted by the shared content hosting and delivery platform.

11. The client computing device of claim 9, wherein the processing device is further to, subsequent to completion of the data transfer and completion of the processing operation of the content item, receive a request for an option to view the content item.

12. The client computing device of claim 9, wherein the processing device is further to, subsequent to completion of the data transfer and completion of the processing operation of the content item, receive data a request for an option to upload a custom image to represent the content item as a thumbnail image.

13. The client computing device of claim 12, wherein the data to update the upload UI are received from the server computing device.

14. The client computing device of claim 9, wherein the client computing device is a tablet computer.

15. The client computing device of claim 9, wherein the client computing device is a mobile phone.

16. A non-transitory computer readable storage medium having instructions that, when executed by a processing device, cause the processing device to perform operations comprising:
creating, by the processing device, a file in a markup language representing an upload user interface (UI) having a window comprising an upload progress indicator of an upload process of a content item, the upload process comprising a data transfer and a processing operation, wherein the data transfer comprises transmission of data of the content item from a client computing device to the server computing device, and wherein the processing operation comprises transcoding the content item;
providing the file to a client device in order for the client device to render the window of the upload UI on the client device, the window of the upload UI comprising the upload progress indicator of the upload process, the upload progress indicator separately depicting progresses of the data transfer and the processing operation;
during the data transfer of the upload process and prior to completion of the upload data transfer and the processing operation:
modify the window of the upload UI to present a first set of actions comprising an option to add the content item to at least one playlist hosted by the shared content hosting and delivery platform and an option to add the content item to at least one channel hosted by the shared content hosting and delivery platform; and
perform one or more actions of the first set of actions responsive to a user request for the one or more actions of the first set of actions via the upload UI; and
subsequent to completion of both of the data transfer and the processing operation of the content item:
modify the window of the upload UI to further present a second set of actions in addition to the first set of actions, the second set of actions comprising an option to edit the content item and an option to share the content item; and
perform one or more actions of the second set of actions responsive to a user request for the one or more actions of the second set of actions via the upload UI.

17. The non-transitory computer-readable storage medium of claim 16, wherein the processing operation comprises a translation process.

18. The non-transitory computer-readable storage medium of claim 16, wherein the instructions, when executed by the processing device, cause the processing device to perform operations further comprising subsequent to completion of the data transfer and completion of the processing operation of the content item, providing, on the upload UI having the upload progress indicator, an option to view the content item.

19. The non-transitory computer-readable storage medium of claim 16, wherein the instructions, when executed by the processing device, cause the processing device to perform operations further comprising subsequent to completion of the data transfer and completion of the processing operation of the content item, providing, on the upload UI having the upload progress indicator, an option to upload a custom image to represent the content item as a thumbnail image.

20. The non-transitory computer-readable storage medium of claim 17, wherein the option to edit the content item enables a user that provides the content item for the upload process to at least one of cut, trim, change a look, or add annotations to the content item.

* * * * *